March 25, 1969 C. S. REIS 3,434,878

METHOD OF FORMING A MULTICOLOR ELECTROSENSITIVE RECORDING MEDIUM AND ARTICLE

Filed Oct. 26, 1964

INVENTOR
CHARLES S. REIS
BY A. C. Smith
ATTORNEY

United States Patent Office 3,434,878
Patented Mar. 25, 1969

3,434,878

METHOD OF FORMING A MULTICOLOR ELECTROSENSITIVE RECORDING MEDIUM AND ARTICLE

Charles S. Reis, Mountain View, Calif., assignor to Hewlett-Packard Company, Palo Alto, Calif., a corporation of California Filed Oct. 26, 1964, Ser. No. 406,361
Int. Cl. B44d *1/18, 1/10;* H01b *1/00*
U.S. Cl. 117—217 5 Claims

ABSTRACT OF THE DISCLOSURE

The method and means for producing multicolor recordings on an electrosensitive recording medium includes a laminated recording medium of dissimilarly colored layers which are selectively removed to expose an underlying layer.

It is an object of the present invention to provide an improved electrosensitive recording medium which produces an electrosensitive recording having a color which is determined by the amplitude of a writing signal.

It is another object of the present invention to provide a method for recording in a plurality of colors on an electrosensitive medium.

It is still another object of the present invention to provide apparatus for recording in a plurality of colors on electrosensitive recording medium.

In accordance with the illustrated embodiment of the present invention, an electrosensitive recording medium is provided which produces a record in a color which is selected by varying the amplitude of the applied writing signals. This is accomplished by coating a suitable backing layer with a conductive material to form a conductive base layer which is then coated with successive layers of electrically conductive materials of dissimilar color. A writing signal applied to the recording medium through a surface-contacting electrode and having a selected amplitude is conducted through the surface coatings to the base layer with sufficient current density to volatilize or otherwise remove or redistribute a preselected one of the coatings in the record region. This produces minute craters of preselected depth in the surface coatings in the regions of high current density under the surface area of the contacting electrode, thereby exposing the coating of desired color in the record region.

Figure 1:
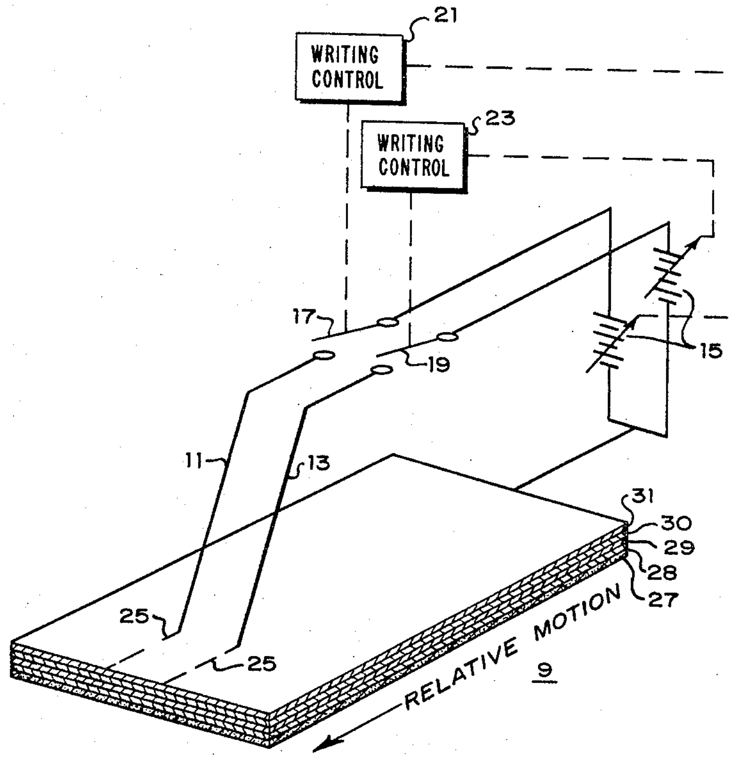
Figure 2:
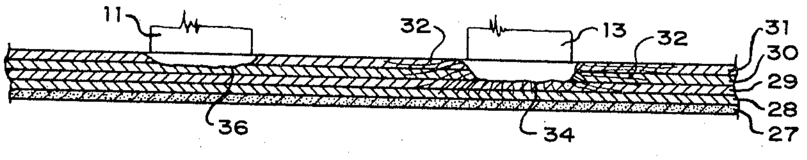

Other and incidental objects of the present invention will be apparent from a reading of this specification and an inspection of the accompanying drawing in which FIGURE 1 is a pictorial diagram of the recording medium and recording apparatus of the present invention and FIGURE 2 is a cross sectional view of the recording medium of FIGURE 1.

Referring to FIGURES 1 and 2 of the drawing, relative motion between the record medium 9 and the surface-contacting electrodes 11, 13 may be produced by moving at least one of the recording medium 9 and electrodes 11, 13 or by moving both at dissimilar velocities. Writing signals from sources 15 are applied to the electrodes 11, 13 disposed in contact with the surface of recording medium 9 through the switches 17, 19 which are actuated by writing controls 21, 23. The amplitudes of the writing signals from sources 15 are also controlled by the writing controls 21, 23 to produce the desired color recording. Contrasting lines or marks 25 of selected color are produced on the medium 9 in response to the applied signals as the electrodes pass along the surface. Apparatus of this type is shown and described in U.S. patent application Ser. No. 287,955, filed on July 14, 1963 by Charles S. Reis.

The electrosensitive recording medium 9 is prepared according to one embodiment of the present invention as follows: an aluminum layer 29 is disposed on suitable backing material 27 such as paper or plastic film using well-known methods. The surface coatings 29, 30, 31 each include 100 grams of indium-doped zinc oxide (an electrical conductor as well as a white pigment), 62.5 grams of a suitable binder such as Lucite No. 2040, 137 milliliters of a solvent such as xylene or toluene. For the lower or sublayers 29, 30, the coating material further includes 6 to 12 grams of a colorant substance which may either be a heat-stable dye such as from the chromophore-azo group having the desired color initially or a composition of materials such as 10% ferric stearate plus 5% gallic acid in acetone or any other suitable color-heat reaction materials which produce the desired color change in response to internal or joule heating caused by the conduction of writing signal therethrough.

This coating material is applied to the conductive base layer 28 to a wet thickness of about 1 mil and is dried to form the first coating 29. Successive ones of the coatings 30 and 31 are then formed in turn in the same manner using coating material having a selected coloring agent, as previously described. The coatings 29–31 thus formed each comprises a matrix of electrically conductive materials and binder which are held in situ on a sublayer 28 with at least sublayers 29, 30 further including a coloring agent disbursed throughout the matrix.

Writing signals of selected amplitude applied to the coatings through electrode 11, 13 cause currents to flow through the conductive material in the coatings 29–31 in the region beneath the contact areas of the electrodes with sufficient current density to elevate the temperature of these local areas of the coatings. It is believed that this causes the binder and other components to volatilize away without charring or discoloring. This leaves the electrically conductive particles in the coating matrix (and the coloring agent in the sublayers 29, 30) unbonded to a lower layer and therefore free to be removed by the surface-contacting electrodes 11, 13. Since the current distribution throughout the layers "fans out" with depth beneath an electrode 11, 13, as shown by flow lines 32, the depth at which the current density remains sufficiently high to volatilize the binder is thus determined by the magnitude of the applied writing signal. As a result, a layer, say 29, of one color is exposed at the base of the crater 34 produced by a wiring signal of one magnitude applied through electrode 13 and a layer, say 30, of another color is exposed at the base of crater 36 produced by a writing signal of smaller magnitude applied through electrode 11.

Therefore, the color of a recording produced according to the present invention is selected by altering the magnitude of a writing signal applied to the recording medium.

I claim:

1. Electrosensitive recording medium comprising:

a base layer;

an electrically conductive first layer on said base layer which is capable of being removed from said base layer at an elevated temperature produced in response to electrical signal conducted thereby;

an electrically conductive second layer on said first layer which is capable of being removed from said first layer at a temperature which is less than said elevated temperature produced in response to electrical signal conducted thereby; and said base layer and said second layer have contrastingly dissimilar colors and said base layer and first layer present contrastingly dissimilar colors upon exposure by removal of an adjacent layer in response to electrical signal conducted thereby.

2. Electrosensitive recording medium as in claim 1 wherein:

at least said second layer includes a coating matrix comprising a binder and particles of a metallic compound capable of being reduced in situ to the corresponding free metal in response to conduction therethrough of electrical signal; and said first layer presents a dissimilar color upon exposure thereof through the second layer.

3. The method of forming a multicolor electrosensitive recording medium comprising the steps of:

forming a base layer of one color;

forming an electrically conductive first layer of another color on said base layer which is capable of being removed therefrom at an elevated temperature produced by conduction of electrical signal by the first layer to expose the base layer of said one color; and forming on said first layer an electrically conductive second layer which has a selected color different from said one and said other colors and which is capable of being removed from the first layer at a temperature that is less than said elevated temperature and that is produced by conduction of current by the second layer to expose the first layer of said other color.

4. The method as in claim 3 wherein:

the step of forming the electrically conductive first layer is performed by depositing on said base layer a coating matrix including a binder, a coloring agent of said other color and particles of a metallic compound which is capable of being reduced in situ to the corresponding free metal in response to conduction therethrough of electrical signal of sufficiently high current density.

5. The method as in claim 4 wherein:

the step of forming the electrically conductive second layer is performed by depositing on said first layer a coating matrix including a binder, a coloring agent of said selected color, and particles of a metallic compound which is capable of being reduced in situ to the corresponding free metal in response to the conduction therethrough of an electrical signal of sufficiently high current density.

References Cited

UNITED STATES PATENTS

| | | | |
|---|---|---|---|
| 3,122,448 | 2/1965 | Hills et al. | 204—2 X |
| 3,299,433 | 1/1967 | Reis | 204—2 X |

FOREIGN PATENTS

| | | |
|---|---|---|
| 537,593 | 6/1941 | Great Britain. |
| 562,501 | 8/1958 | Canada. |

WILLIAM L. JARVIS, *Primary Examiner.*

U.S. Cl. X.R.

117—215; 346—74; 204—2